Dec. 10, 1929.   A. FORBERG   1,739,220
BROACH
Filed Oct. 31, 1927
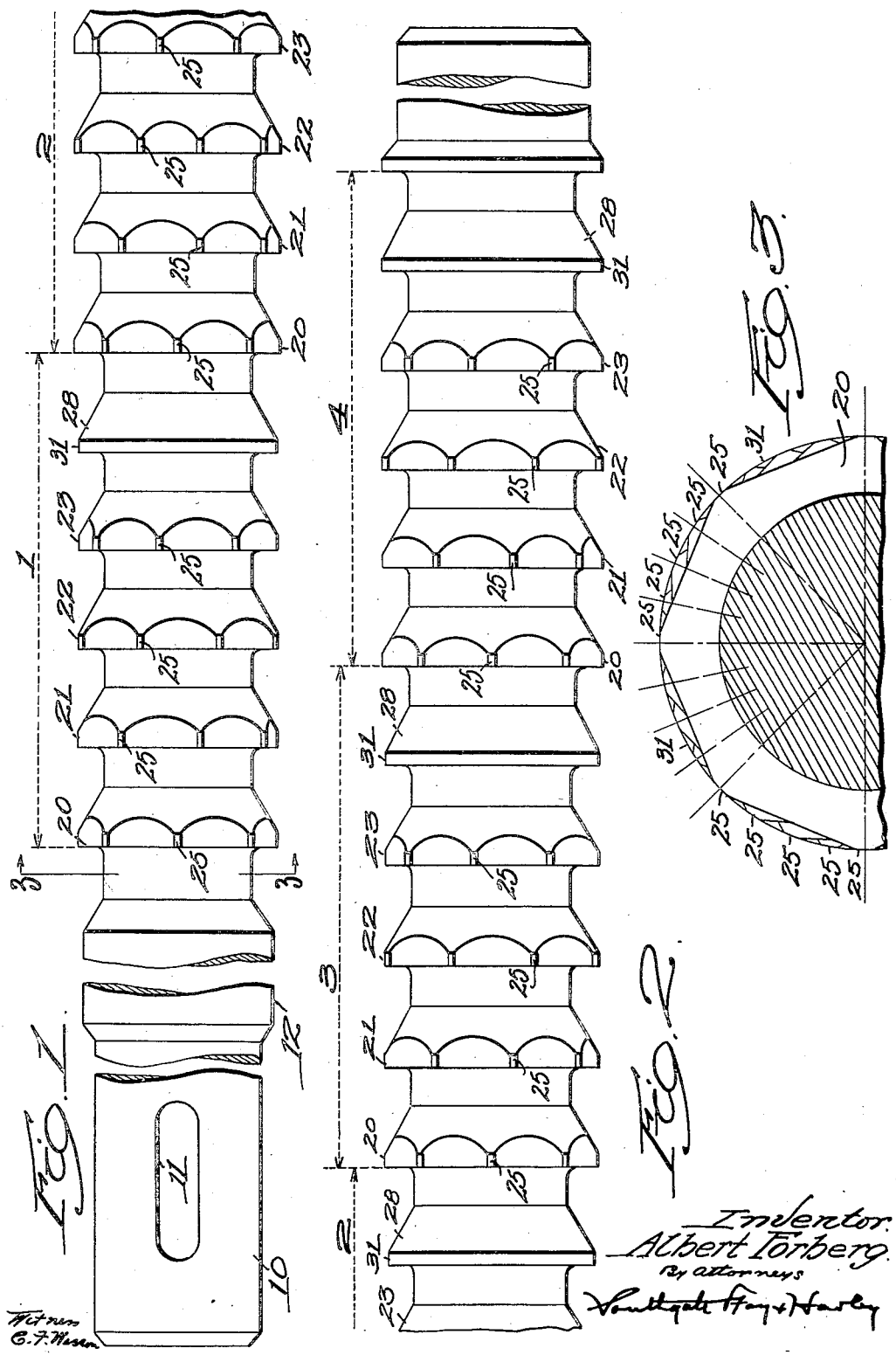

Patented Dec. 10, 1929

1,739,220

UNITED STATES PATENT OFFICE

ALBERT FORBERG, OF HUDSON, MASSACHUSETTS, ASSIGNOR TO LA POINTE MACHINE TOOL COMPANY, OF HUDSON, MASSACHUSETTS, A CORPORATION OF MAINE

BROACH

Application filed October 31, 1927. Serial No. 229,829.

This invention relates to a tool for broaching holes and particularly for broaching cylindrical holes or holes having a cross section with a continuously curved periphery, such as an oval or elliptical section.

It is the general object of my invention to provide a broach by which such holes may be machined more easily and accurately and with less strain upon the broach and work. A further object is to provide a broach by which both roughing and finishing cuts may be made by the use of a single broach.

With these general objects in view, an important feature of my invention relates to the provision of a series of cutting or broaching sections each substantially polyangular in shape, with the angles of each section out of axial alignment with the angles of each adjacent section.

While my improved broach may comprise a single series of such cutting sections, I also contemplate the use of successive groups or series of cutting sections, adapted to machine a hole by successive steps to a final finish diameter.

My invention further relates to arrangements and combinations of parts which will be hereinafter described and more particularly pointed out in the appended claim.

A preferred form of the invention is shown in the drawings in which

Fig. 1 is a side elevation of one end portion of my improved broach;

Fig. 2 is a side elevation of the other end portion of the broach, and

Fig. 3 is a partial sectional end view, taken along the line 3—3 in Fig. 1.

Referring to the drawings, I have shown a broach having an end portion or shank 10, with a slot 11 to receive a cross pin by which the broach may be detachably secured in a broaching head. The broach is also preferably provided with a guiding or centering portion 12, as in the usual construction, and with a substantial number of broaching or cutting sections.

These broaching or cutting sections are preferably arranged in successive groups or series, each series comprising a plurality of cutting or broaching sections. Each group or series as shown in the drawings comprises five cutting sections, the first four of which, as 20, 21, 22, and 23, are polyangular in cross section, as clearly indicated in Fig. 3. Each cutting section is provided with a relatively narrow cutting edge or portion 25 at the apex of each angle, and the portions 25 in successive cutting sections are out of alignment with each other.

Furthermore, in the preferred form all of the cutting portions 25 in a single series of cutting elements are out of axial alignment with each other, and they are spaced so as to be substantially equally spaced about the periphery of the broach. The final cutter 28 of each series is preferably provided with a continuous cutting edge, as indicated at 31 in Fig. 3, this final cutter acting to trim out the ridges left between the cutting portions 25 and give the hole a continuous finished surface.

While a single series of cutting sections, as above described, constitutes a complete broaching unit and may be used by itself to broach a hole, it is desirable to provide successive groups or series of cutting elements, each formed of a plurality of polyangular cutting sections followed by a single continuous finishing section. The outside diameter of all of the cutting sections in a single series is preferably the same, but the outside diameters of the successive groups will increase slightly from group to group until the hole is brought to its final or finished size.

In the last or full sized group, it may be desirable to add additional continuous finish cutting sections to complete the finished outline of the holes and to guide the broach during the latter part of the broaching operation.

Having described the details of construction of my improved broach, the use and advantages thereof will be readily apparent. The broach is particularly well adapted for broaching cored holes in castings of iron, brass or other metals, as the narrow cutting portions 25 of the polyangular sections easily cut under the scale of the casting, the action being similar to that of the narrow pointed tool of a planer or shaper. In this way, the wear on the cutting edges and the strain on the broach and work are greatly reduced, and a substantially larger amount of stock may be removed if necessary.

While I have indicated the cutters as disposed in groups or series of five, with the polyangular sections octagonal in shape, it will be understood that both the number of cutters in a group or series and also the number of angles per section or cutter may be varied to suit operating conditions.

Having thus described my invention and the advantages thereof, I do not wish to be limited to the details herein disclosed otherwise than as set forth in the claim, but what I claim is:—

A broach for finishing a cylindrical hole, comprising a plurality of series of cutting sections, each series comprising a plurality of successive cutting sections substantially polyangular in outline, and having narrow cutting portions at the angles of said section and circumferentially spaced apart, the cutting portions of each section being positioned out of axial alignment with the cutting portions of adjacent sections, and a circular cutting section for each series, the outside diameters of the cutting sections in each series being substantially the same as the circular section of said series, and the diameters of successive series being each progressively and slightly increased over the preceding series.

In testimony whereof I have hereunto affixed my signature.

ALBERT FORBERG.